United States Patent
Hong et al.

(10) Patent No.: US 10,108,242 B2
(45) Date of Patent: Oct. 23, 2018

(54) METHOD OF CONTROLLING POWER SUPPLY IN SUBMERSION AND ELECTRONIC DEVICE THEREOF

(71) Applicant: SAMSUNG ELECTRONICS CO., LTD., Suwon-si, Gyeonggi-do (KR)

(72) Inventors: Eunseok Hong, Suwon-si (KR); Shinho Kim, Uiwang-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 76 days.

(21) Appl. No.: 15/248,208

(22) Filed: Aug. 26, 2016

(65) Prior Publication Data

US 2017/0102762 A1 Apr. 13, 2017

(30) Foreign Application Priority Data

Oct. 7, 2015 (KR) .................. 10-2015-0140938

(51) Int. Cl.
*H02H 5/08* (2006.01)
*G06F 1/32* (2006.01)
(Continued)

(52) U.S. Cl.
CPC .............. *G06F 1/3206* (2013.01); *G06F 1/26* (2013.01); *G06F 11/3058* (2013.01); *H02H 5/083* (2013.01)

(58) Field of Classification Search
CPC .... G06F 1/1656; G06F 11/3058; H02H 5/083
See application file for complete search history.

(56) References Cited

U.S. PATENT DOCUMENTS

| 2011/0105100 A1* | 5/2011 | Tanaka | H01H 13/702 455/418 |
| 2015/0001200 A1* | 1/2015 | Harper | G06F 1/1656 219/209 |

(Continued)

FOREIGN PATENT DOCUMENTS

| JP | 2006-208219 | 8/2006 |
| KR | 10-0523901 | 10/2005 |
| KR | 10-1040161 | 6/2011 |

*Primary Examiner* — Albert Wang
(74) *Attorney, Agent, or Firm* — Nixon & Vanderhye P.C.

(57) ABSTRACT

An electronic device includes: a power source unit including power supply circuitry configured to supply power and a signal corresponding to the power; a power management unit including power management circuitry configured to receive the power from the power source unit to supply the power to the electronic device; a controller configured to be activated when receiving the power from the power management unit to supply a signal corresponding to the power to the power management unit; and a plurality of submersion recognition patterns connected between the power source unit and the power management unit and between the power management unit and the controller, the plurality of submersion recognition patterns configured to recognize submersion of the electronic device, wherein the electronic device is shut down when at least one of the plurality of submersion recognition patterns recognizes submersion, and the electronic device is configured to maintain shutdown when submersion is recognized, even if a request for power supply occurs at the power source unit.

17 Claims, 8 Drawing Sheets

(51) Int. Cl.
*G06F 11/30* (2006.01)
*G06F 1/26* (2006.01)

(56) References Cited

U.S. PATENT DOCUMENTS

| | | | |
|---|---|---|---|
| 2015/0016000 A1* | 1/2015 | Quirk | H02H 5/083 361/78 |
| 2016/0004283 A1* | 1/2016 | Ganguly | G06F 1/1656 307/118 |

* cited by examiner

METHOD OF CONTROLLING POWER SUPPLY IN SUBMERSION AND ELECTRONIC DEVICE THEREOF

CROSS-REFERENCE TO RELATED APPLICATION

The present application is related to and claims priority under 35 U.S.C. § 119 to a Korean patent application filed on Oct. 7, 2015 in the Korean intellectual property office and assigned serial number 10-2015-0140938, the entire disclosure of which is incorporated by reference herein.

TECHNICAL FIELD

The present disclosure relates to a method of controlling power supply and an electronic device thereof.

BACKGROUND

As electronic devices have a diversified function, the electronic devices have a close relationship to a user life. As the electronic devices have a close relationship to a user life, the electronic devices may be in various situations. For example, the electronic device may be in a submerged situation. The electronic device may be damaged due to submersion.

When the electronic device has a submersion label therein, it may be determined through the submersion label whether the electronic device is submerged.

When the electronic device is submerged, power thereof may be turned off. In a state in which the electronic device is turned off due to submersion, in order to use again the electronic device, a user may turn on power thereof. At this time, while power of the electronic device is turned on, a major chip thereof may be damaged.

SUMMARY

The present disclosure addresses the above problems and provides a method and device for shutting down power supply, when an electronic device is submerged.

The present disclosure further provides a method and device for preventing (maintaining shutdown) the electronic device from being booted, when a request for power supply of the electronic device occurs in a state in which the electronic device is shut down due to submersion.

In accordance with an aspect of the present disclosure, an electronic device includes: a power source unit including power supply circuitry configured to supply power and a signal corresponding to the power; a power management unit including circuitry configured to receive the power from the power source unit to supply the power to the electronic device; a controller configured to be activated when receiving the power from the power management unit to input a signal corresponding to the power to the power management unit; and a plurality of submersion recognition patterns connected between the power source unit and the power management unit and between the power management unit and the controller and configured to recognize submersion of the electronic device, wherein the electronic device is shut down, when at least one of the plurality of submersion recognition patterns recognizes submersion, and the electronic device maintains shutdown, even if a request for power supply occurs at the power source unit.

In accordance with another aspect of the present disclosure, a method of controlling power supply of an electronic device includes: shutting down, when submersion of the electronic device is recognized, the electronic device; determining, when the electronic device is shut down, whether a request for supplying power to the electronic device occurs; determining, if a request for supplying power to the electronic device occurs, whether the electronic device is submerged using a plurality of submersion recognition patterns; and maintaining, if submersion of the electronic device is recognized using at least one of the plurality of submersion recognition patterns, shutdown of the electronic device.

BRIEF DESCRIPTION OF THE DRAWINGS

The objects, features, and advantages of the present disclosure will be more apparent from the following detailed description, taken in conjunction with the accompanying drawings, in which like reference numerals refer to like elements wherein.

DETAILED DESCRIPTION

Figure 1:
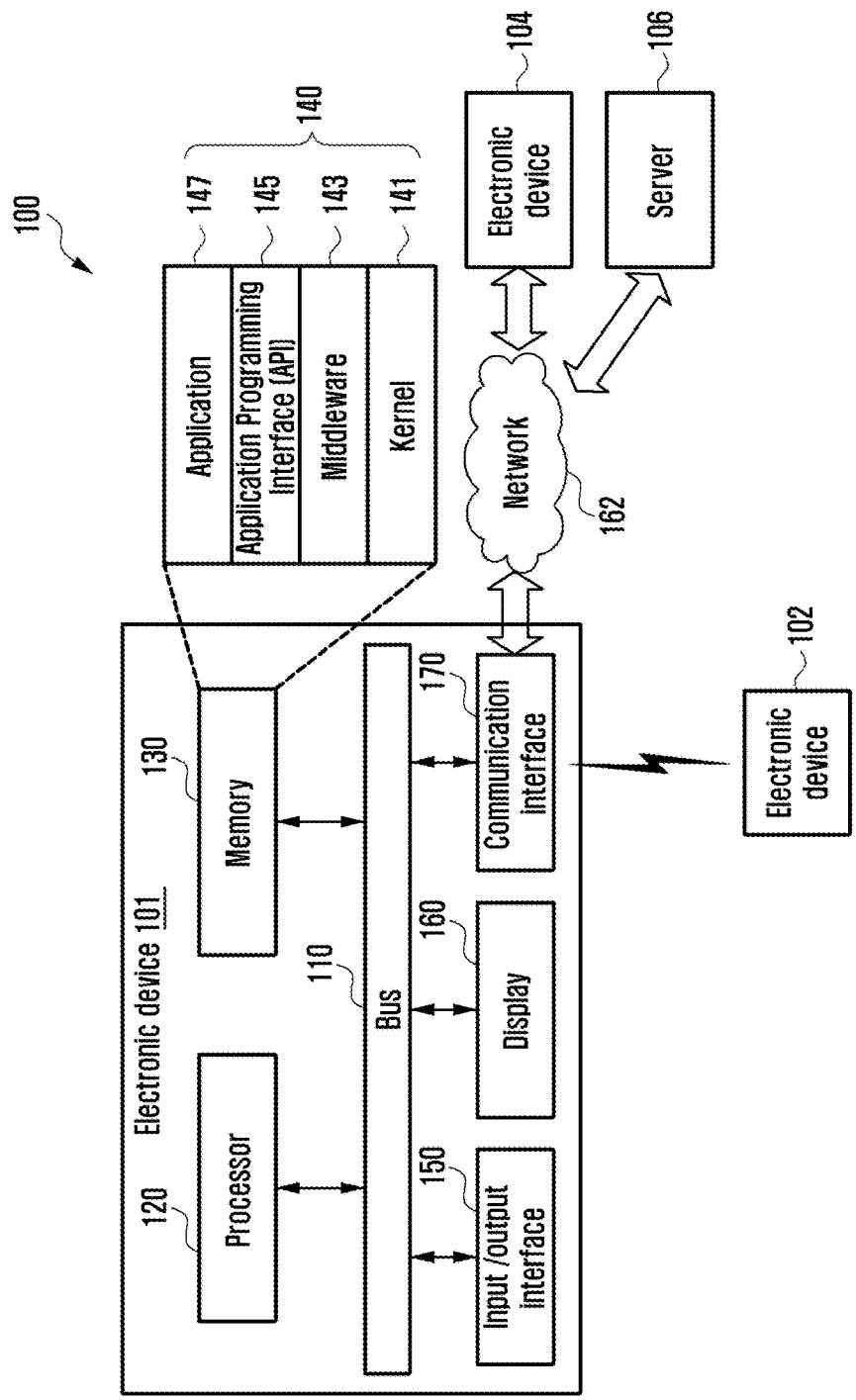
FIG. 1 is a diagram illustrating an example network environment including an electronic device according to an example embodiment of the present disclosure.

Hereinafter, example embodiments of the present disclosure are described in greater detail with reference to the accompanying drawings. In the following description of example embodiments, descriptions of well-known functions and structures incorporated herein may be omitted to avoid obscuring the subject matter of the present disclosure and for clarity and conciseness.

The following description with reference to the accompanying drawings is provided to assist in a comprehensive understanding of example embodiments of the present disclosure. The following description includes various specific details to assist in that understanding but these are to be regarded as mere examples. Various changes and modifications of the example embodiments described herein can be made without departing from the scope and spirit of the present disclosure.

Expressions such as "include" and "may include", as used herein, may indicate the presence of the disclosed functions, operations, and constituent elements, but do not limit one or more additional functions, operations, and constituent elements. Herein, terms such as "include" and/or "have" may be construed to indicate a certain characteristic, number, step, operation, constituent element, component or a combination thereof, but may not be construed to exclude the existence of, or a possibility of, one or more other additional characteristics, numbers, steps, operations, constituent elements, components or combinations thereof.

In the present disclosure, the expression "and/or" includes any and all combinations of the associated listed words. For example, the expression "A and/or B" may include A, include B, or both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions merely distinguish an element from the other elements. For example, a first user device and a second user device indicate different user devices although both devices are user devices. For example, a first element could be referred to as a second element, and similarly, a second element could also be referred to as a first element without departing from the scope of the present disclosure.

When is referred to as being "connected" to or "accessed" by to other component, not only is the component directly connected to or accessed by the other component, but also there may exist another component between them. Meanwhile, when a component is referred to as being "directly connected" or "directly accessed" to other component, it should be understood that there is no component therebetween.

The terms used in the present disclosure are merely used to describe example embodiments of the present disclosure, and are not intended to limit the present disclosure. As used herein, the singular forms of terms are intended to include the plural forms as well, unless the context clearly indicates otherwise.

In this disclosure, an electronic device may be able to perform a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group (MPEG) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch), or the like.

According to some example embodiments of the present disclosure, an electronic device may be a smart home appliance that involves a communication function. For example, an electronic device may be a television (TV), a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like.

According to some example embodiments of the present disclosure, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for a ship (e.g., a marine navigation system, a gyrocompass, etc.), avionics, security equipment, or an industrial or home robot, or the like.

According to some example embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.), or the like. An electronic device disclosed herein may be one of the above-mentioned devices or any combination thereof. The above-mentioned electronic devices are merely listed as examples and not to be considered as a limitation of this disclosure.

FIG. 1 is a block diagram illustrating an example network environment including therein an electronic device in accordance with an example embodiment of the present disclosure.

Referring to FIG. 1, an electronic device 101 in a network environment 100 may include, but is not limited to, a bus 110, a processor 120, a memory 130, an input/output interface 150, a display 160, and a communication interface 170.

The bus 110 may be a circuit designed for connecting the above-discussed elements and communicating data (e.g., a control message) between such elements.

The processor 120 may receive commands from the other elements (e.g., the memory 130, the input/output interface 150, the display 160, or the communication interface 170, etc.) through the bus 110, interpret the received commands, and perform the arithmetic or data processing based on the interpreted commands.

The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be composed of software, firmware, hardware, and any combination thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may operate between the kernel 141 and either one or both of the API 145 and the application 147, in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may deliver commands or data, entered by a user through an input/output unit (e.g., a sensor, a keyboard, or a touch screen), to the processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display. The display 160 may display various types of contents (e.g., text, images, videos, icons, or symbols) for users. The display module 160 may include a touch screen, and may receive, for example, a touch, gesture, proximity, or hovering input by using an electronic device or a part of the user's body.

The communication interface 170 may perform a communication between the electronic device 101 and any external electronic device (e.g., the electronic device 104 or the server 106). For example, the communication interface 170 may communicate with any external device by being connected with a network 162 through a wired or wireless communication.

The wireless communication may include, but not limited to, at least one of Wi-Fi, Bluetooth (BT), near field communication (NFC), global navigation satellite system (GNSS), or a cellular communication (e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc.).

GNSS may include at least one of GPS, global navigation satellite system (Glonass), Beidou Navigation Satellite System (Beidou), Galileo, or the European global satellite-based navigation system. The terms "GPS" and the "GNSS" may be used interchangeably herein.

The wired communication may include, but not limited to, at least one of universal serial bus (USB), high definition multimedia interface (HDMI)), recommended standard 232 (RS-232), or plain old telephone service (POTS).

The network 162 includes, as a telecommunications network, at least one of a computer network (e.g., a local area network (LAN) or a wide area network (WAN)), the Internet, and a telephone network.

The first and second external electronic devices 102 and 104 may be of the same or different type of electronic device as the type of the electronic device 101. The server 106 may include a group of one or more servers.

Some or all of operations performed in the electronic device 101 may be performed in one or more other electronic devices 102 or 104 or the server 106. When the electronic device 101 performs a certain function or service automatically or in response to a request, the electronic device 101 may request at least a portion of functions related to the function or service from another electronic device 102 or 104 or the server 106 instead of or in addition to performing the function or service for itself. Either of the other electronic devices 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
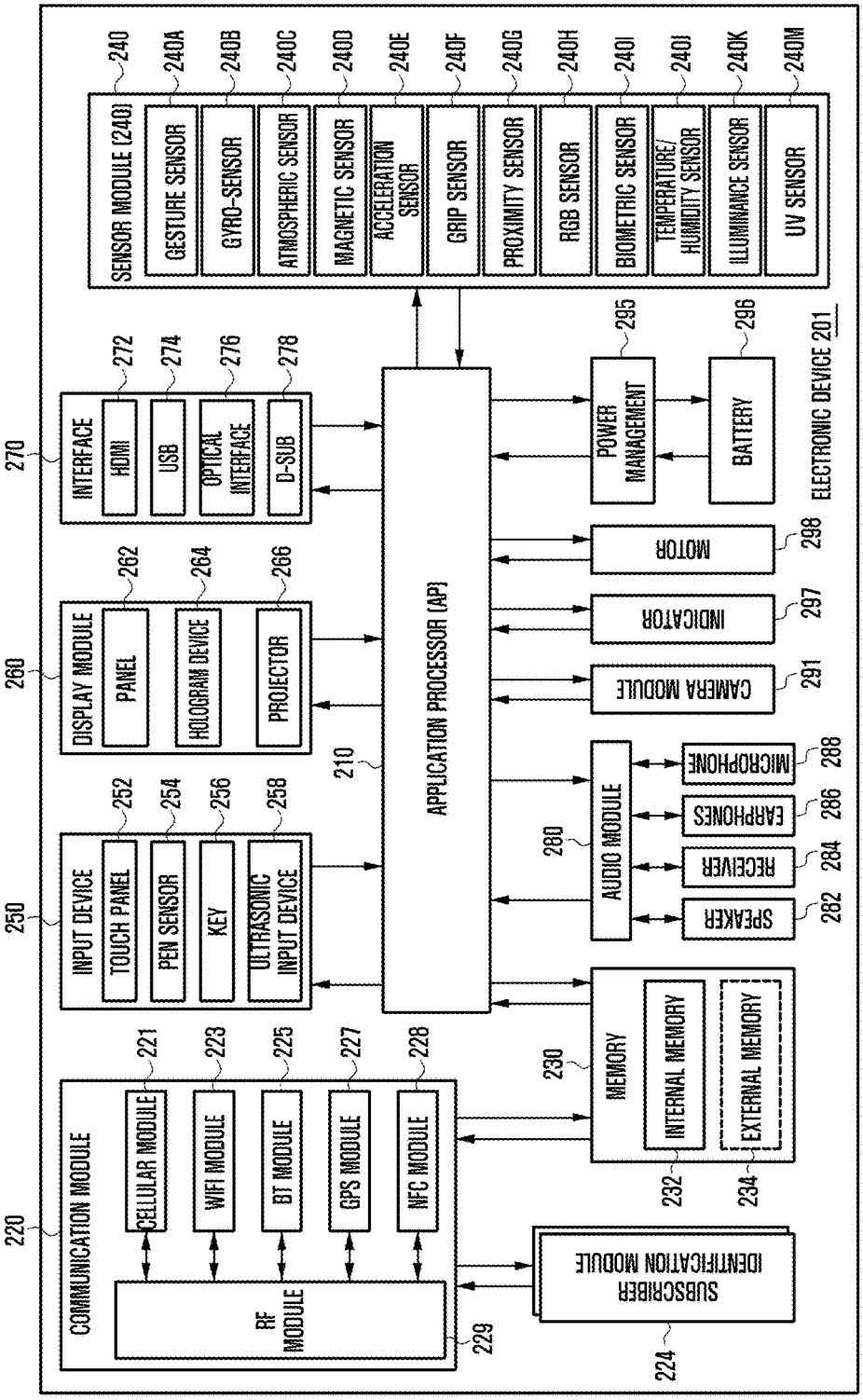
FIG. 2 is a block diagram illustrating an example configuration of an electronic device according to various example embodiments of the present disclosure.

FIG. 2 is a block diagram illustrating an example electronic device according to an example embodiment of the present disclosure.

Referring to FIG. 2, an electronic device 201 may form, for example, all or a part of the electronic device 101 illustrated in FIG. 1. the electronic device 201 may include at least one application processor (AP) 210, a communication module (e.g., including various communication circuitry) 220, a subscriber identification module (SIM) module 224, a memory 230, a sensor module (e.g., including various sensors and/or sensing circuitry) 240, an input device 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of a system-on-chip (SoC), for example. According to an embodiment of the present disclosure, the AP 210 may further include a graphic processing unit (GPU).

The communication module 220 (e.g., the communication interface 170) may perform a data communication with any other electronic device (e.g., the electronic device 104 or the server 106) connected to the electronic device 201 (e.g., the electronic device 101) through the network. According to an embodiment of the present disclosure, the communication module 220 may include therein various communication circuitry, including, for example and without limitation, at least one of a cellular module 221, a Wi-Fi module 223, a BT module 225, a GNSS module 227, an NFC module 228, and a radio frequency (RF) module 229.

The cellular module 221 may offer a voice call, a video call, a message service, an internet service, and the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM module 224. According to an embodiment of the present disclosure, the cellular module 221 may perform at least a part of functions that the AP 210 can provide. For example, the cellular module 221 may perform at least part of a multimedia control function.

Each of the Wi-Fi module 223, the BT module 225, the GNSS module 227 and the NFC module 228 may include a processor for processing data transmitted or received therethrough. Although FIG. 2 illustrates the cellular module 221, the Wi-Fi module 223, the BT module 225, the GNSS module 227 and the NFC module 228 as different components, at least a part of these components may be contained in a single integrated circuit (IC) chip or a single IC package according to an embodiment of the present disclosure.

The RF module 229 may transmit and receive data, e.g., RF signals or any other electric signals. The RF module 229 may include a transceiver, a power amplifier module (PAM), a frequency filter, a low noise amplifier (LNA), and the like. Although FIG. 2 illustrates that the cellular module 221, the Wi-Fi module 223, the BT module 225, the GNSS module 227 and the NFC module 228 share the RF module 229, at least one of these components may perform transmission and reception of RF signals through a separate RF module according to an embodiment of the present disclosure.

The SIM module 224 may include, for example, an embedded SIM and/or a SIM card, and may include unique identification information (e.g., an integrated circuit card identifier (ICCID)) or subscriber information (e.g., international mobile subscriber identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a dynamic random access memory (RAM) (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a not AND (NAND) flash memory, a Not OR (NOR) flash memory, etc.). According to an embodiment of the present disclosure, the internal memory 232 may be in the form of a solid state drive (SSD).

The external memory 234 may further include a flash drive, for example, a compact flash (CF), a secure digital (SD), a micro-secure digital (Micro-SD), a mini-secure digital (Mini-SD), an extreme digital (xD), a memory stick, and the like. The external memory 234 may be functionally connected to the electronic device 201 through various interfaces.

According to an example embodiment of the present disclosure, the memory 230, when executed, may store instructions to cause the processor 210 to confirm the characteristics of a function and surrounding network environment information, in response to a function performance request, and to perform the function through one of the first band and the second band of the external device on the basis of at least one of the characteristic of the function and the surrounding network environment information.

According to an example embodiment of the present disclosure, the memory 230 may store instructions to cause the processor 210 to perform a first function through the first band if the function includes the first function and to perform a second function through the second band if the function includes the second function.

According to an example embodiment of the present disclosure, the memory 230 may store instructions to cause the processor 210 to confirm a communication type of the function, and to perform the function through the first band if the communication type of the function is a message transmission/reception type, whereas to perform the function through the second band if the communication type of the function is a streaming type or a file transmission/reception type.

According to an example embodiment of the present disclosure, the memory 230 may store instructions to cause the processor 210 to confirm a data transfer rate of the function, and to perform the function through the first band if the data transfer rate is less than a predetermined value, whereas to perform the function through the second band if the data transfer rate is at least equal to the predetermined value.

According to an example embodiment of the present disclosure, the memory 230 may store instructions to cause the processor 210 to confirm at least one value of the received signal strength indicator (RSSI), modulation and coding scheme (MCS), and/or stream of at least one external device, and to perform the function through one of the first band and the second band of the external device, which is determined to have the highest signal strength.

The sensor module 240 may measure physical quantity or sense an operating status of the electronic device 201, and then convert measured or sensed information into electrical signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature/humidity sensor 240J, an illuminance sensor 240K, and a UV (ultraviolet) sensor 240M. Additionally or alternatively, the sensor module 240 may include, e.g., an E-nose sensor, an EMG (electromyography) sensor, an EEG (electroencephalogram) sensor, an ECG (electrocardiogram) sensor, an IR (infrared) sensor, an iris scan sensor, or a finger scan sensor. Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. The touch panel 252 may further include a tactile layer. In this case, the touch panel 252 may offer a tactile feedback to a user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone 288 of the terminal through a pen generating an ultrasonic signal, and to identify data.

According to an example embodiment of the present disclosure, the input device 250 may receive an input for designating one of the first band and the second band to be used for the function.

The display 260 (e.g., the display 150) may include a panel 262, a hologram 264, or a projector 266. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment of the present disclosure, the display 260 may further include a control circuit for controlling the panel 262, the hologram 264, and the projector 266.

The interface 270 may include, for example, an HDMI 272, a USB 274, an optical interface 276, or a D-subminiature (D-sub) 278. The interface 270 may be contained, for example, in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may perform a conversion between sounds and electric signals. At least part of the audio module 280 may be contained, for example, in the input/output interface 150 illustrated in FIG. 1. The audio module 280 may process sound information inputted or outputted through a speaker 282, a receiver 284, an earphone 286, or the microphone 288.

The camera module 291 is a device capable of obtaining still images and moving images. According to an embodiment of the present disclosure, the camera module 291 may include at least one image sensor (e.g., a front sensor or a rear sensor), a lens, an image signal processor (ISP), or a flash (e.g., a light emitting diode (LED) or xenon lamp).

The power management module 295 may include power management circuitry configured to manage electric power of the electronic device 201. The power management module 295 may include various circuitry, such as, for example and without limitation, a power management integrated circuit (PMIC), a charger IC, or a battery gauge. The PMIC may be mounted to, for example, an IC or an SoC semiconductor. Charging methods may be classified into a wired charging method and a wireless charging method. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of a part thereof (e.g., the AP 210). The motor 298 may convert an electric signal into a mechanical vibration. The electronic device 201 may include a specific processor (e.g., a GPU) for supporting a mobile TV. This processor may process media data that comply with standards of digital multimedia broadcasting (DMB), digital video broadcasting (DVB), or media flow.

Each of the above-described elements of the electronic device disclosed herein may be formed of one or more components, and the name of each element may vary according to the type of the electronic device. The electronic device disclosed herein may be formed of at least one of the above-discussed elements without some elements or with additional other elements. Some of the elements may be integrated into a single entity that still performs the same functions as the respective functions of such elements before integrated.

Figure 3:
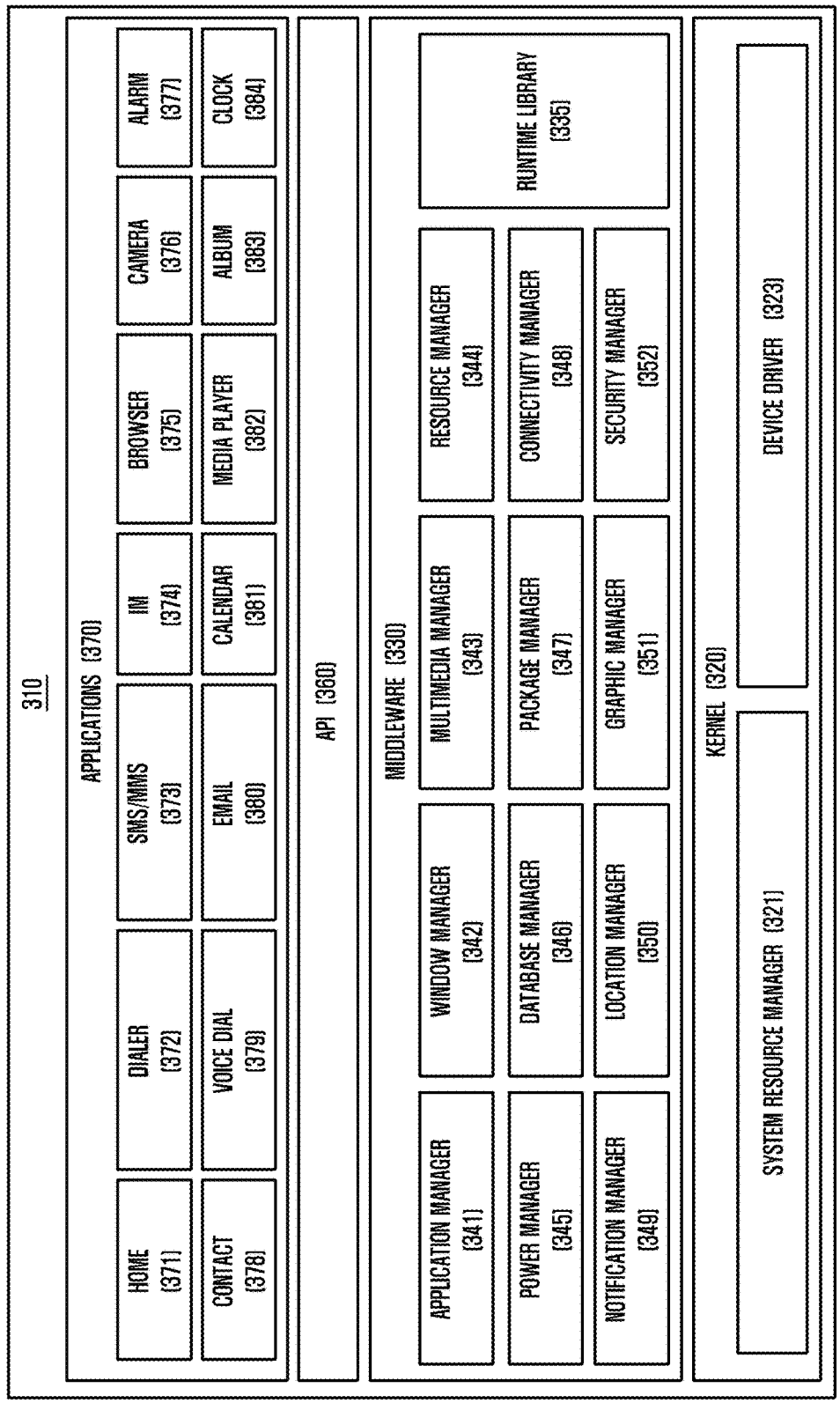
FIG. 3 is a block diagram illustrating an example configuration of a program module according to various example embodiments of the present disclosure.

FIG. 3 is a block diagram illustrating an example program module according to an example embodiment of the present disclosure.

Referring to FIG. 3, a program module 310 (e.g., the program 140) may include an operating system (OS) controlling resources related to the electronic device (e.g., the electronic device 101) and/or various applications (e.g., the application 147) that are driven on the operating system. The operating system may include, e.g., Android™ iOS™, Windows™, Symbian™, Tizen™, or Bada™.

The program module 310 may include, e.g., a kernel 320, middleware 330, an API 360, and/or an application 370. At least a part of the program module 310 may be preloaded on the electronic device or may be downloaded from any external electronic device (e.g., the electronic device 104 of the server 106).

The kernel 320 (e.g., the kernel 141 of FIG. 1) may include, e.g., a system resource manager 321 and/or a device driver 323. The system resource manager 321 may perform control, allocation, or recovery of system resources and may include a process managing unit, a memory managing unit, and/or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly implemented by applications 370. The middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module used by a compiler to add a new function through a programming language while, e.g., the application 370 is being executed. The runtime library 335 may perform input/output management, memory management, and/or arithmetic functions.

The application manager 341 may manage the life cycle of at least one application of, e.g., the applications 370. The window manager 342 may manage graphical user interface (GUI) resources used on the screen. The multimedia manager 343 may determine formats utilized to play various media files and use a codec appropriate for a format to perform encoding or decoding on media files. The resource manager 344 may manage resources, such as source code of at least one of the applications 370, memory and/or storage space.

The power manager 345 may operate together with, e.g., a basic input/output system (BIOS) to manage battery or power and provide power information utilized for operating the electronic device. The database manager 346 may generate, search, and/or query a database to be used in at least one of the applications 370. The package manager 347 may manage installation or update of an application that is distributed in the form of a package file.

The connectivity manager 348 may manage wireless connectivity, such as, e.g., Wi-Fi or BT. The notification manager 349 may display or notify an event, such as a coming message, appointment, and/or proximity notification without interfering with the user. The location manager 350 may manage locational information on the electronic device. The graphic manager 351 may manage graphic effects to be offered to the user and their related user interface. The security manager 352 may provide various security functions utilized for system security and/or user authentication. When the electronic device (e.g., the electronic device 101) has telephony capability, the middleware 330 may further include a telephony manager for managing voice call and/or video call functions of the electronic device. The middleware 330 may include various functions of the above-described components. The middleware 330 may provide a specified module per type of the operating system to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The applications 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar) (not shown), and/or environmental information (e.g., provision of air pressure, moisture, or temperature information) (not shown). The application 370 may include information exchanging application supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device. For example, a notification relay application may include a function for relaying notification information generated from other applications of the electronic device (e.g., the SMS/MMS application, the email application, the health-care application, or the environmental information application) to the external electronic device (e.g., the electronic devices 102 and 104). Further, the notification relay application may receive notification information from, e.g., the external electronic device and may provide the received notification information to the user. A device management application may perform at least some functions of the external electronic device (e.g., the electronic device 102 or 104) such as, for example, turning on/off the external electronic device (or some components of the external electronic device), control brightness (or resolution) of the display, etc. The device management application may manage (e.g., install, delete, or update) an application operating in the external electronic device or a service (e.g., call service or message service) provided from the external electronic device.

The application 370 may include an application (e.g., a health-care application) selected depending on the attribute (e.g., as an attribute of the electronic device, the type of electronic device is a mobile medical device) of the external electronic device (e.g., the electronic devices 102 and 104). The application 370 may include an application received from the external electronic device (e.g., the server 106 or electronic devices 102 and 104). The application 370 may include a preloaded application or a third party application downloadable from a server. The names of the components of the program module 310 according to the illustrated embodiment may be varied depending on the type of operating system. At least a part of the program module 310 may be implemented in software, firmware, hardware, or in a combination of two or more thereof. At least a part of the programming module 310 may be implemented (e.g., executed) by e.g., a processor (e.g., the AP 210). At least a part of the program module 310 may include e.g., a module, a program, a routine, a set of instructions, a process, or the like for performing one or more functions.

The term "module" used in this disclosure may refer to a certain unit that includes one or more of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of processing circuitry (e.g., including, for example, a CPU), an ASIC (Application-Specific Integrated Circuit) chip, FPGAs (Field-Programmable Gate Arrays), and programmable-logic device, which have been known or are to be developed.

The above-described example embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

Figure 4:
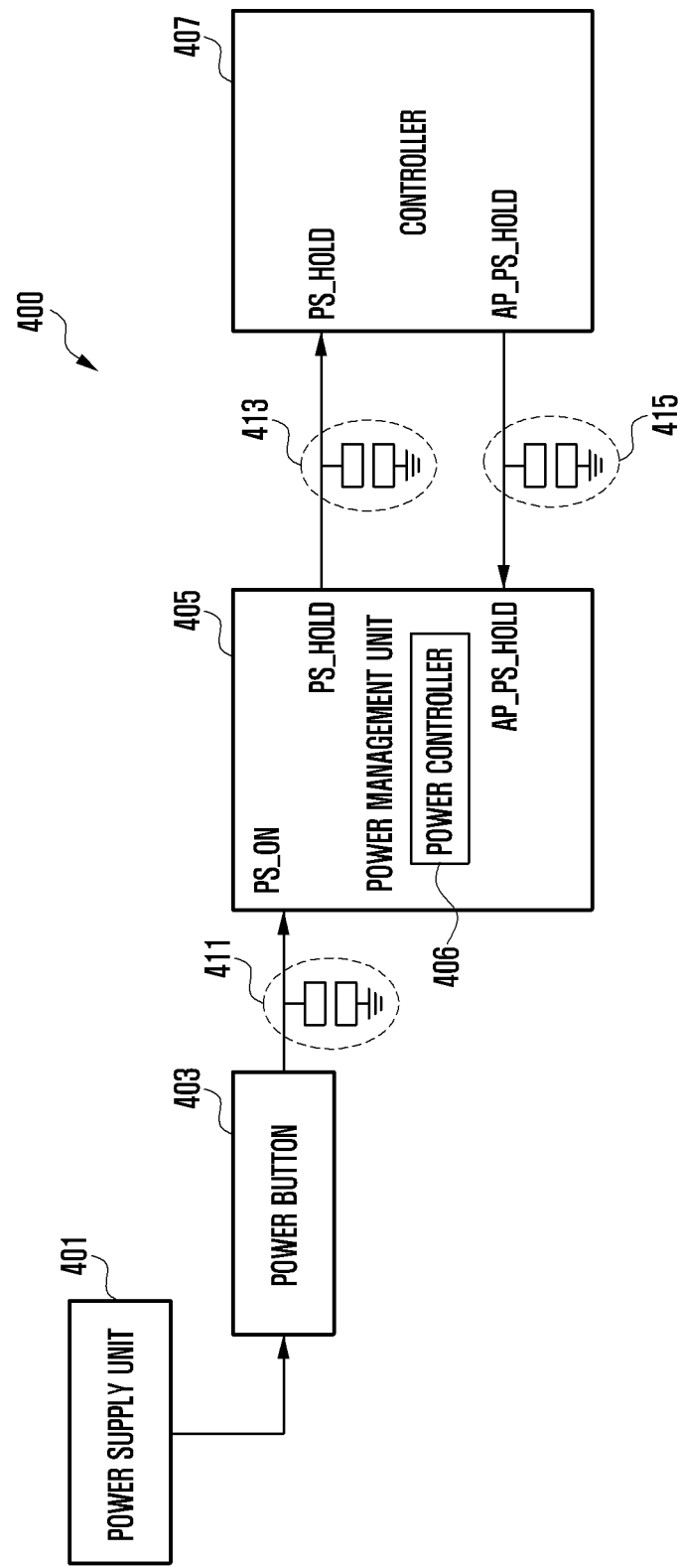
FIG. 4 is a circuit diagram illustrating an example circuit that controls power supply when an electronic device is submerged according to various example embodiments of the present disclosure.

FIG. 4 is a circuit diagram illustrating an example circuit that controls power supply when an electronic device is submerged according to various example embodiments of the present disclosure.

Referring to FIG. 4, a circuit 400 of the electronic device may include a power supply unit 401, a power button 403, a power management unit (e.g., including power management circuitry) 405, a controller 407, and a plurality of submersion recognition patterns 411, 413, and 415.

The circuit 400 of the electronic device may be formed within the electronic device 101 of FIG. 1 to control power supply of the electronic device 101.

According to an example embodiment, the circuit 400 of the electronic device 101 may recognize submersion of the electronic device 101 using the plurality of submersion recognition patterns 411, 413, and 415.

The first submersion recognition pattern 411 may be connected to a first power line. When an input that requests power supply occurs at the power button 403, the first power line may be set to supply power from the power supply unit 401 to the power management unit 405. When the first submersion recognition pattern 411 recognizes submersion, the first submersion recognition pattern 411 is electrically connected to the first power line to short-circuit the first power line.

The second submersion recognition pattern 413 may be connected to a second power line. When an input occurs at the power button 403 for a predetermined time (e.g., 3 seconds), the second power line may be set to input power from the power management unit 405 to the controller 407 upon maintaining the user input. When the second submersion recognition pattern 413 recognizes submersion, the second submersion recognition pattern 413 is electrically connected to the second power line to short-circuit the second power line.

The third submersion recognition pattern 415 may be connected to a third power line. The third power line may be set to send a signal corresponding to power input from the power management unit 405 to the controller 407 from the controller 407 to the power management unit 405. When the third submersion recognition pattern 415 recognizes submersion, the third submersion recognition pattern 415 is electrically connected to the third power line to short-circuit the third power line.

When the first power line, second power line, and third power line are short-circuited, the electronic device 101 may be shut down. Even if an input occurs at the power button 403, the shut-down electronic device 101 may maintain a shutdown state in a submersion recognition state thereof. The submersion recognition state may be a state in which submersion of the electronic device 101 is recognized by the plurality of submersion recognition patterns 411, 413, and 415.

Figure 5:
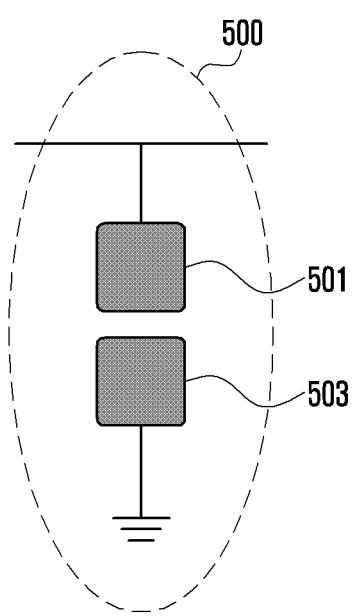
FIG. 5 is a diagram illustrating an example submersion recognition pattern according to various example embodiments of the present disclosure.

FIG. 5 is a diagram illustrating an example of a submersion recognition pattern according to various example embodiments of the present disclosure.

Referring to FIG. 5, a submersion recognition pattern 500 may be an illustration of a plurality of submersion recognition patterns 411, 413, and 415 of FIG. 4.

In an example embodiment, the submersion recognition pattern 500 may be connected to a power line at an adjacent location, such as a Subscriber Identity Module (SIM) card, Secure Digital (SD) card, IF connector, and earjack in which submersion of the electronic device 101 generally occurs and may be mounted on a Printed Circuit board (PCB).

The submersion recognition pattern 500 may be made of a conductive material and may be made of a material having a function that may pool water.

The submersion recognition pattern 500 may be formed in at least two patterns 501 and 503. For example, when a first pattern 501 of the submersion recognition pattern 500 recognizes submersion, a second pattern 502 may be grounded. The number of the submersion recognition pattern 500 is not limited to two illustrated in FIG. 5. For example, the submersion recognition pattern 500 may be formed in three patterns; one pattern thereof may determine submersion and two other patterns thereof may be grounded.

For example, the submersion recognition pattern 500 is formed in a plurality of patterns, and when a specific pattern recognizes submersion, other specific patterns are grounded. Here, the number of specific patterns is not limited.

When the submersion recognition pattern 500 in a not-submerged state recognizes submersion through at least one pattern in a state that is not electrically connected to a power line, the submersion recognition pattern 500 may be electrically connected to the power line. When the submersion recognition pattern 500 is electrically connected to the power line, the submersion recognition pattern 500 may short-circuit the power line. When at least one power line is short-circuited, power may not be supplied to the circuit 400 of the electronic device 101.

Referring again to FIG. 4, in an example embodiment, in a state in which the electronic device 101 is turned on, the first submersion recognition pattern 411 may recognize submersion. A state in which the electronic device 101 is turned on may refer, for example, to a state in which booting of the electronic device 101 is complete by an input of the power button 403 regardless of whether the electronic device 101 is used. When the electronic device 101 is turned on, the first submersion recognition pattern 411 may recognize submersion in a state that is not electrically connected to the first power line. The first power line may supply power from the power supply unit 401 to the power management unit 405 by an input of the power button 403. When the first submersion recognition pattern 411 recognizes submersion, the first submersion recognition pattern 411 may be short-circuited from the electrically connected first power line. When the first power line is short-circuited, power PS_ON may not be input from the power supply unit 401 to the power management unit 405 and the electronic device 101 may be shut down.

When the first submersion recognition pattern 411 recognizes submersion, the electronic device 101 may detect an input of the power button 403 in a shutdown state. That is, as the electronic device 101 recognizes submersion, in a state in which power of the electronic device 101 is turned off, the electronic device 101 may detect an input of the power button 403 for turning on power (for supplying power).

When the first submersion recognition pattern 411 recognizes submersion, even if the electronic device 101 detects an input of the power button 403, the first power line is short-circuited and thus power may not be supplied to the power management unit 405. That is, the electronic device 101 may maintain a power off state.

In another example embodiment, in a state in which the electronic device 101 is turned on, the second submersion recognition pattern 413 may recognize submersion. Because the second submersion recognition pattern 413 does not recognize submersion, even if power is supplied to the power management unit 405, when the second submersion recognition pattern 413 recognizes submersion, power may not be supplied to the controller 407. When the electronic device 101 is turned on, if the second submersion recognition pattern 413 recognizes submersion, the second submersion recognition pattern 413 may be electrically connected to the second power line. When the electronic device 101 detects a user input at the power button 403 for a predetermined time (e.g., 3 seconds), the second power line may input power from the power management unit 405 to the controller 407. When the second submersion recognition pattern 413 is electrically connected to the second power line, the second power line may be short-circuited. When the second power line is short-circuited, a power driving holding signal PS_HOLD input from the power management unit 405 to the controller 407 may not be input to the controller 407. That is, as the power button 403 is pressed, even if a power driving signal PS_ON for supplying power to the electronic device 101 is input, a power driving holding signal PS_HOLD may not be input from the power management unit 405 to the controller 407. The power driving holding signal PS_HOLD may be a signal input to represent that power supply from the power management unit 405 to the controller 407 is maintained and may be a signal for driving (activating) the controller 407.

For example, when a power line connected to the second submersion recognition pattern 413 is short-circuited, the electronic device 101 may be shut down.

As the second submersion recognition pattern 413 recognizes submersion, in a state in which the electronic device 101 is shut down, the electronic device 101 may detect an input of the power button 403. When the second submersion recognition pattern 413 recognizes submersion, even if an input of the power button 403 is detected, a second power line in which a power driving holding signal PS_HOLD is input to the controller 407 is short-circuited and thus power may not be supplied to the controller 407. That is, because power is not supplied to the controller 407, the electronic device 101 may maintain an off state. When the second submersion recognition pattern 413 recognizes submersion, power may be input to the power management unit 405 by an input of the power button 403 but power may not be input to the controller 407. This is because the power driving holding signal PS_HOLD signal notifying that an input of the power button is maintained may not be input from the power management unit 405 to the controller 407.

In another example embodiment, in a state in which the electronic device 101 is turned on, the third submersion recognition pattern 415 may recognize submersion. When the third submersion recognition pattern 415 recognizes submersion, a power holding signal AP_PS_HOLD corresponding to power input from the controller 407 to the power management unit 405 may not be input. When the electronic device 101 is turned on, in a state in which the third submersion recognition pattern 415 is not electrically connected to the third power line, the third submersion recognition pattern 415 may recognize submersion. As the electronic device 101 detects a user input for a predetermined time, the controller 407 is activated and thus the third power line may input a signal that maintains power from the controller 407 to the power management unit 405. When the third submersion recognition pattern 415 recognizes submersion, the third submersion recognition pattern 415 may be electrically connected to the third power line to be grounded and short-circuit the third power line. As the third submersion recognition pattern 415 is grounded, the third power line electrically connected to the third submersion recognition pattern 415 may be short-circuited. When the third power line is short-circuited, a power holding signal AP_PS_HOLD input from the controller 407 to the power management unit 405 may not be input. The power holding signal AP_PS_HOLD is a feedback signal when the controller 407 receives power from the power management unit 405 and may be a signal for transferring to the power management unit 405 that the controller 407 is being driven. When the power management unit 405 does not receive an input of a power holding signal from the controller 407, the electronic device 101 may be shut down.

As the third submersion recognition pattern 415 recognizes submersion, in a state in which the electronic device 101 is shut down, the electronic device 101 may detect an input of the power button 403. When the electronic device 101 recognizes submersion by the third submersion recognition pattern 415, the power management unit 405 may not receive an input of a power holding signal from the controller 407. When the power management unit 405 does not receive an input of a power holding signal from the controller 407, the electronic device 101 may maintain an off state. When power is input from the power supply unit 401 by an input of the power button 403, in order to control the input power, the power management unit 405 may include a power controller 406. For example, the power controller 406 may be a microcomputer. When the third submersion recognition pattern 415 recognizes submersion, the power controller 406 may control to electrically connect the third submersion recognition pattern 415 to the power line. When the third submersion recognition pattern 415 is electrically connected to the power line, the power controller 406 may ground the third submersion recognition pattern 415 and short-circuit the third power line. As the power line connected to the third submersion recognition pattern 415 is short-circuited, the electronic device 101 may maintain a power off state.

Figure 6:
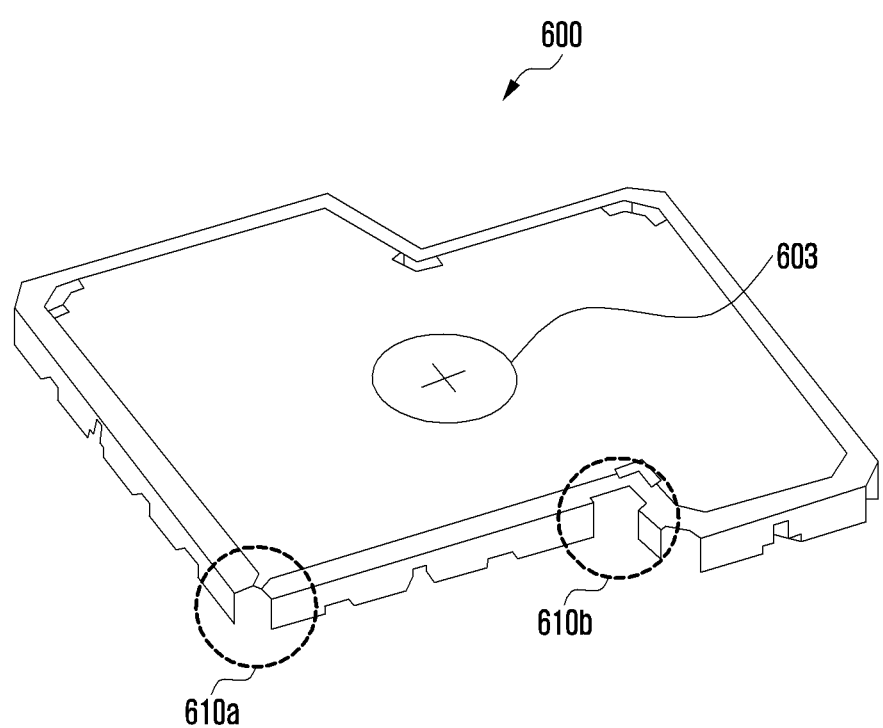
FIG. 6 is a diagram illustrating another example of a submersion recognition pattern according to various example embodiments of the present disclosure.

FIG. 6 is a diagram illustrating another example of a submersion recognition pattern according to various example embodiments of the present disclosure.

Referring to FIG. 6, the submersion recognition pattern may be a shield can 600 that covers a surface of a major chip (e.g., Application Processor (AP), Communication Processor (CP), and memory) of the electronic device 101 on a PCB. The shield can 600 may have a slit in a corner, side wall, and bent portion in a production process. When the electronic device 101 is submerged, water may be injected into the slit. When water is injected into the slit, a voltage may be grounded through a pattern formed in the shield can 600. As the first pattern 501 of FIG. 5 recognizes submersion, holes 610a and 610b may recognize submersion. As a voltage is grounded through the second pattern 503 of FIG. 5, a voltage may be grounded through a pattern 603 formed in the shield can. When the submersion recognition pattern is the shield can 600, the plurality of submersion recognition patterns 411, 413, and 415 of FIG. 4 may be omitted.

In an example embodiment, the shield can 600 may be formed in a structure that covers a surface of the power management unit 405 and the controller 407.

Figure 7:
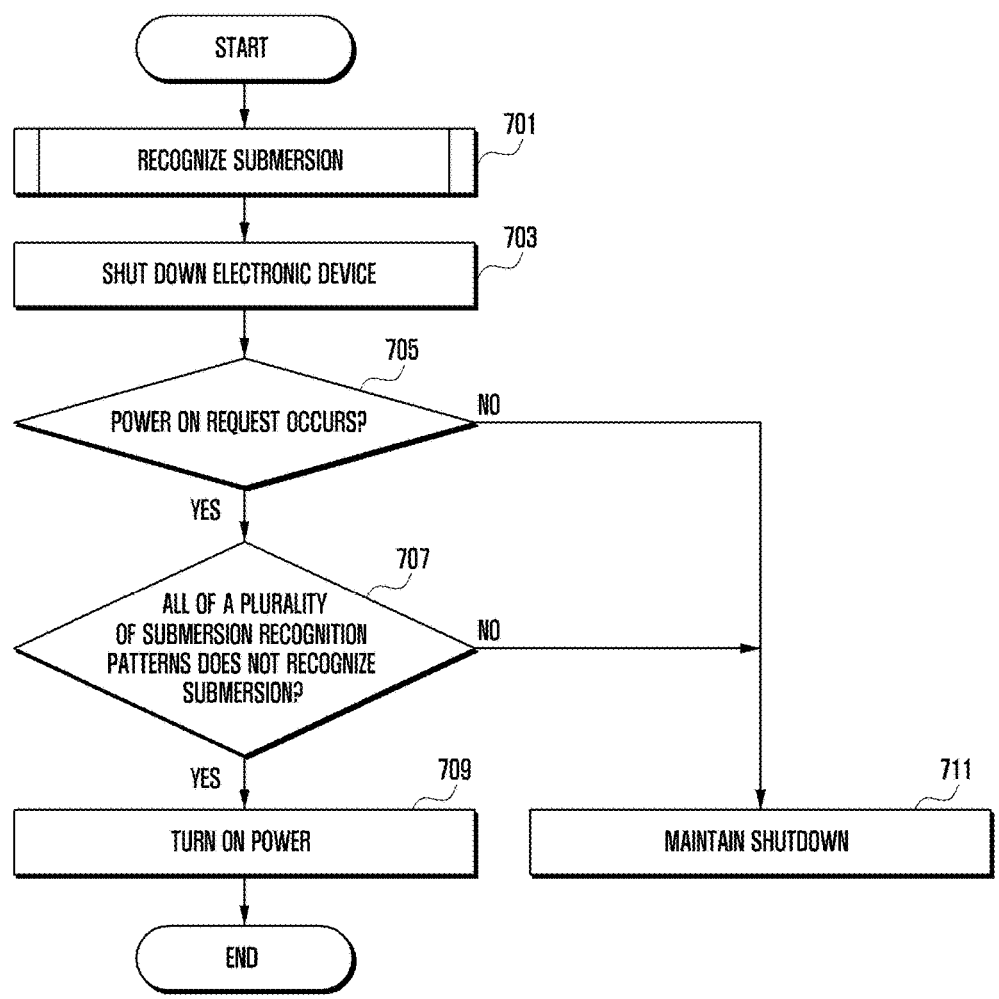
FIG. 7 is a flowchart illustrating an example method of preventing an electronic device from being booted when the electronic device is submerged according to various example embodiments of the present disclosure.

FIG. 7 is a flowchart illustrating an example method of preventing an electronic device from being booted when the electronic device is submerged according to various example embodiments of the present disclosure.

The electronic device 101 may recognize submersion thereof through a plurality of submersion recognition patterns at operation 701.

Operation in which the electronic device 101 is submerged will be described with reference to FIG. 8.

Figure 8:
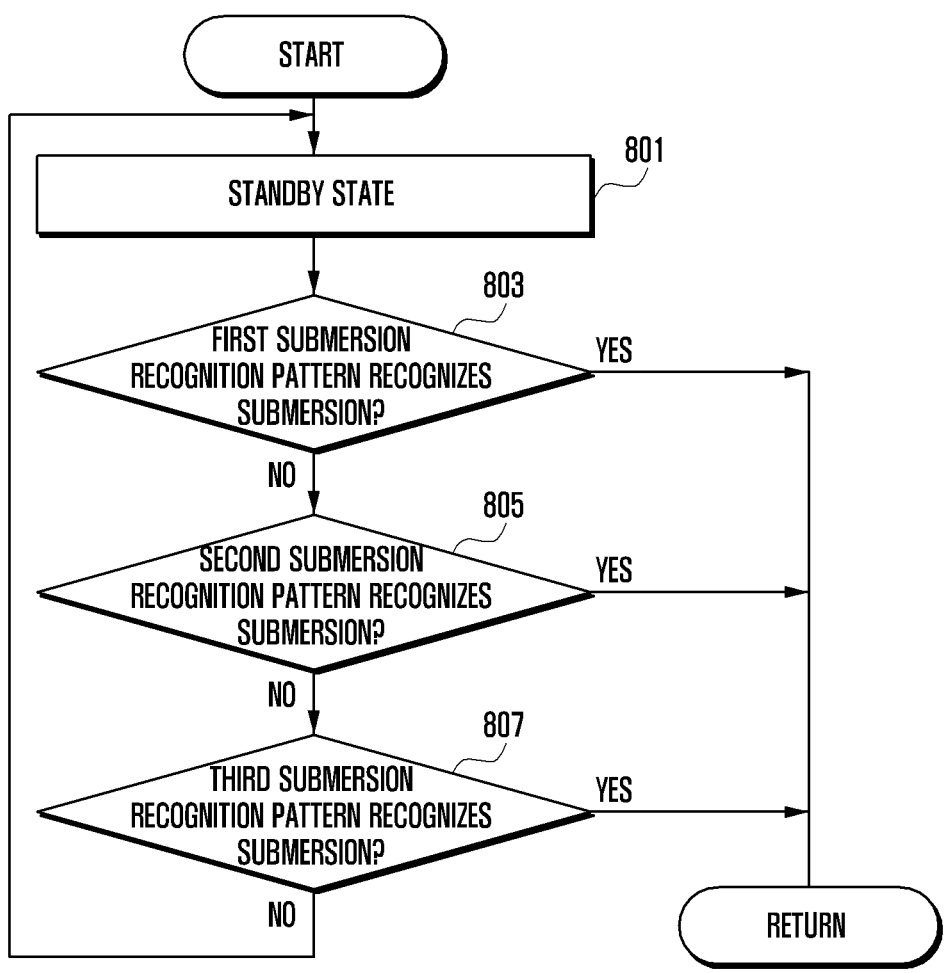
FIG. 8 is a flowchart illustrating an example method of shutting down power supply of an electronic device when the electronic device is submerged according to various example embodiments of the present disclosure.

FIG. 8 is a flowchart illustrating an example method of shutting down power supply of an electronic device when the electronic device is submerged according to various example embodiments of the present disclosure.

Referring to FIGS. 4 and 8, the electronic device 101 may be in a standby state at operation 801. A standby state may refer, for example, to a state in which at least one module of the electronic device 101 is turned on, as a user input occurs to a power button of the electronic device 101. A standby state may be a state in which the electronic device 101 is turned on and in which any operation is performing by a user and may be a state in which a display is turned off, as a user input occurs to a power button regardless of whether the electronic device 101 is used.

The electronic device 101 may determine whether the first submersion recognition pattern 411 recognizes submersion in a standby state at operation 803. If the first submersion recognition pattern 411 recognizes submersion, the process returns to operation 703 of FIG. 7 and the electronic device 101 may be shut down at operation 703 of FIG. 7.

If the first submersion recognition pattern 411 does not recognize submersion, the electronic device 101 may determine whether the second submersion recognition pattern 413 recognizes submersion at operation 805. If the second submersion recognition pattern 413 recognizes submersion, the process returns to operation 703 of FIG. 7 and the electronic device 101 may be shut down at operation 703 of FIG. 7.

If the second submersion recognition pattern 413 does not recognize submersion, the electronic device 101 may determine whether the third submersion recognition pattern 415 recognizes submersion at operation 807. If the third submersion recognition pattern 415 recognizes submersion, the process returns to operation 703 of FIG. 7 and the electronic device 101 may be shut down at operation 703 of FIG. 7. If the third submersion recognition pattern 415 does not recognize submersion, the process returns to operation 801 and the electronic device 101 may maintain a standby state.

As described above, the electronic device 101 may determine through the plurality of submersion recognition patterns 411, 413, and 415 whether the electronic device 101 is submerged. The plurality of submersion recognition patterns 411, 413, and 415 each may include a plurality of patterns, as described with reference to FIGS. 5 and 6. A specific pattern of a plurality of patterns included in each of the plurality of submersion recognition patterns 411, 413, and 415 may recognize whether the electronic device 101 is submerged and other specific patterns may be grounded. When at least one of the plurality of submersion recognition patterns 411, 413, and 415 recognizes submersion, the electronic device 101 may be shut down. When the electronic device 101 is shut down by submersion, even if a request for power supply occurs through an input of the power button 403, the request may be ignored. That is, when at least one of the plurality of submersion recognition patterns 411, 413, and 415 recognizes submersion, the power line is short-circuited and an input of the power button 403 may be ignored. In order to supply power to the electronic device 101 (i.e., in order to turn on the electronic device 101), the electronic device 101 may determine whether a power on request occurs at operation 705.

If a power on request does not occur, the electronic device 101 may maintain shutdown at operation 711. That is, the electronic device 101 may maintain a power off state.

If a power on request occurs, the electronic device 101 may determine whether the entirety or all of a plurality of submersion recognition patterns 411, 413, and 415 does not recognize submersion at operation 707. Determination on whether the entire of a plurality of submersion recognition patterns 411, 413, and 415 does not recognize submersion may be determined by determining whether the electronic device 101 is submerged in order of the first submersion recognition pattern 411, the second submersion recognition pattern 413, and the third submersion recognition pattern 415.

For example, if the first submersion recognition pattern 411 recognizes submersion, the electronic device 101 may maintain an off state. If the first submersion recognition pattern 411 does not recognize submersion, the electronic device 101 may determine whether the second submersion recognition pattern 413 recognizes submersion. If the second submersion recognition pattern 413 recognizes submersion, the electronic device 101 may maintain an off state. If the second submersion recognition pattern 413 does not recognize submersion, the electronic device 101 may determine whether the third submersion recognition pattern 415 recognizes submersion. If the third submersion recognition pattern 415 recognizes submersion, the electronic device 101 may maintain an off state. If the third submersion recognition pattern 415 does not recognize submersion, the electronic device 101 may determine that the electronic device 101 is not submerged by the plurality of submersion recognition patterns 411, 413, and 415.

In the foregoing description, the number of submersion recognition patterns is three but is not limited thereto.

If the entirety/all of a plurality of submersion recognition patterns 411, 413, and 415 does not recognize submersion, the electronic device 101 may turn on power at operation 709. If at least one of the plurality of submersion recognition patterns 411, 413, and 415 recognizes submersion, the electronic device 101 may maintain shutdown at operation 711.

In an example embodiment, as described above, in a submerged situation, operation of shutting down power of the electronic device 101 and preventing the electronic device 101 from being booted may be used or may not be used as an option at user setting step.

As described above, according to various example embodiments of the present disclosure, an electronic device can previously prevent damage (fault) due to submersion.

Example embodiments of the present disclosure described in the specification and the drawings are only examples illustrating various features of the present disclosure and provided to aid in understanding of the present disclosure, and do not limit the scope of the present disclosure. It will be apparent to those having ordinary knowledge in the technical field, to which the present disclosure pertains, that it is possible to practice other modified embodiments based on the technical idea of the present disclosure as well as the example embodiments disclosed herein.

What is claimed is:

1. An electronic device, comprising:
a power source unit including power supply circuitry configured to supply power;
a power management unit including power management circuitry configured to receive the power from the power source unit to supply the power to the electronic device;
a controller configured to be activated when receiving the power from the power management unit to supply a signal corresponding to the power to the power management unit; and
a plurality of submersion recognition patterns configured to recognize submersion of the electronic device, at least one of the plurality of the submersion recognition patterns being connected between the power source unit and the power management unit and between the power management unit and the controller,
wherein the electronic device is configured to be shut down, when at least one of the plurality of submersion recognition patterns recognizes submersion, by short-circuiting a power line connected to at least one of the plurality of submersion recognition patterns, and the electronic device is configured to maintain shutdown when submersion is recognized, even if a request for power supply occurs at the power source unit.

2. The electronic device of claim 1, wherein power is supplied from the power source unit to the electronic device, when the all of the plurality of submersion recognition patterns do not recognize submersion.

3. The electronic device of claim 1, wherein a power line that supplies power from the power source unit to the power management unit is configured to be short-circuited, when a submersion recognition pattern connected to the power line that is configured to supply power from the power source unit to the power management unit recognizes submersion.

4. The electronic device of claim 1, wherein a power line that supplies power to the power management unit and the controller is configured to be short-circuited, when a submersion recognition pattern connected to the power line that is configured to supply power from the power management unit to the controller recognizes submersion.

5. The electronic device of claim 1, wherein a power line that is configured to supply a signal corresponding to the power to the controller and the power management unit is short-circuited when a submersion recognition pattern connected to the power line that is configured to supply a signal corresponding to the power from the controller to the power management unit recognizes submersion.

6. The electronic device of claim 1, wherein the submersion recognition pattern comprises at least two conductive terminals, and
the submersion recognition pattern is grounded through at least one other conductive terminal, when the submersion recognition pattern recognizes submersion through one conductive terminal.

7. The electronic device of claim 6, wherein the submersion recognition pattern comprises a shield can.

8. The electronic device of claim 1, wherein the power management circuitry of the power management unit comprises a power controller configured to control power supplied from the power source unit, and
the power controller is configured to determine whether a submersion recognition pattern connected between the power management unit and the controller recognizes submersion, even if power is supplied from the power source unit, and the power controller is configured to down the electronic device, if the submersion recognition pattern recognizes submersion.

9. The electronic device of claim 1, wherein the plurality of submersion recognition patterns are electrically connected to a power line between the power source unit and the power management unit and between the power management unit and the controller to be grounded, when the plurality of submersion recognition patterns recognize submersion of the electronic device.

10. A method of controlling power supply of an electronic device, the method comprising:
   shutting down, when submersion of the electronic device is recognized, the electronic device;
   determining whether a request for supplying power to the electronic device occurs;
   determining, in response to the request for supplying power to the electronic device, whether the electronic device is submerged using a plurality of submersion recognition patterns; and
   maintaining, based on identifying whether at least one of the plurality of submersion recognition patterns is submerged, shutdown of the electronic device,
   wherein the shutting down of the electronic device comprises shutting down the electronic device by short-circuiting a power line connected to at least one of the plurality of submersion recognition patterns.

11. The method of claim 10, further comprising supplying power to the electronic device, if all of the plurality of submersion recognition patterns do not recognize submersion.

12. The method of claim 10, wherein shutting down the electronic device comprises short-circuiting a power line that supplies power from the power source unit to the power management unit, when a submersion recognition pattern connected to a power line that supplies power from the power source unit to the power management unit recognizes submersion.

13. The method of claim 10, wherein shutting down the electronic device comprises short-circuiting a power line that supplies power to the power management unit and the controller, when a submersion recognition pattern connected to a power line that supplies power from the power management unit to the controller recognizes submersion.

14. The method of claim 10, wherein shutting down the electronic device comprises short-circuiting a power line that supplies a signal corresponding to the power to the controller and the power management unit, when a submersion recognition pattern connected to a power line that supplies a signal corresponding to the power from the controller to the power management unit recognizes submersion.

15. The method of claim 10, wherein the submersion recognition pattern comprises at least two conductive terminals, and
   maintaining shutdown of the electronic device comprises grounding the submersion recognition pattern through at least one other conductive terminal, when the submersion recognition pattern recognizes submersion through one conductive terminal.

16. The method of claim 15, wherein the submersion recognition pattern includes a shield can.

17. The method of claim 10, wherein the plurality of submersion recognition patterns are electrically connected to a power line between a power source unit comprising power supply circuitry and a power management unit comprising power management circuitry, and between the power management unit and a controller to be grounded, when the plurality of submersion recognition patterns recognize submersion of the electronic device.

* * * * *